O. R. CHASE.
MACHINES FOR MAKING CABLE-PIPE CANDIES.

No. 194,954. Patented Sept. 11, 1877.

Witnesses.
Harry King.
D. P. Cowl.

Inventor:
Oliver R. Chase,
By his Attorneys,
Stansbury & Munn.

UNITED STATES PATENT OFFICE.

OLIVER R. CHASE, OF BOSTON, MASSACHUSETTS.

IMPROVEMENT IN MACHINES FOR MAKING CABLE-PIPE CANDIES.

Specification forming part of Letters Patent No. 194,954, dated September 11, 1877; application filed August 1, 1877.

*To all whom it may concern:*

Be it known that I, OLIVER RICE CHASE, of Boston, in the county of Suffolk and State of Massachusetts, have invented certain new and useful Improvements in Machine for Making Cable-Pipe Candy; and I do hereby declare that the following is a full, clear, and exact description thereof, which will enable others skilled in the art to which it appertains to make and use the same, reference being had to the accompanying drawings, and to the letters of reference marked thereon, which form a part of this specification.

Figure 1:
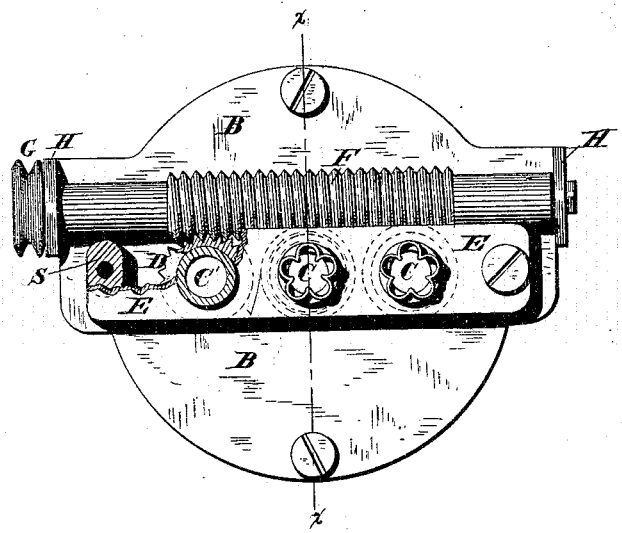
Figure 2:
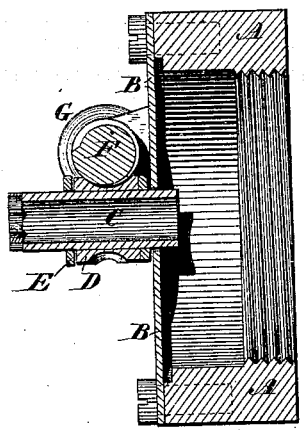
Figure 3:

Figure 1 is a front elevation of the delivery end of the machine, showing the dies and the mechanism for operating them. Fig. 2 is a vertical longitudinal central section on line $x\ x$ of Fig. 1. Fig. 3 is a view of the pipe or stick of candy manufactured by the machine.

Like letters mark similar parts in the several figures.

The nature of my invention consists in passing the paste from which the pipe or stick candy is to be made through one or more dies, having the proper internal configuration to impart a fluted or corded form to the plastic material, the rotation of the die during the passage of the plastic material through it giving a spiral arrangement to the flutes, and producing the desired resemblance to a cable, which gives name to the product.

The paste or plastic mass to be converted into pipe having been prepared, is placed in a receptacle provided with proper mechanism for forcing the material in a continuous mass through one or more dies attached to one end of the receptacle.

The propulsion of the paste may be effected by means of a plunger or by blades or plates spirally arranged around a central shaft, the particular mode of moving the mass being no part of my present application.

In the drawing, A marks a ring, which is to be screwed or otherwise attached to the delivery end of the receptacle. To the front of this ring is screwed the plate B, perforated for the reception of the inner ends of the dies C. These dies are tubes, having at their front ends the fluted form shown in the drawing. They have worm-gears D attached to them, and are supported near their outer ends by the bar E fixed upon studs S projecting from the face of plate B. The gears D engage with a long worm, F, which drives them all simultaneously, receiving its own motion by means of a cord from any suitable power turning the small grooved pulley G. The worm F turns in brackets H attached to plate B.

The operation is obvious from the construction. The paste being forced in any convenient way through the dies C, rotation is imparted to them, which gives a spiral direction to the flutes impressed upon the exterior of the pipe by the dies.

The degree of inclination of the flutes to the line of direction of the issuing-pipe will depend upon the relative speed of the moving paste and the rotating dies, which can be regulated at will.

What I claim is—

1. In a machine for making pipe or stick candy, rotating dies, constructed, arranged, and operating substantially as described, for the purpose of giving a spiral direction to the flutes impressed upon the surface of the pipe by the peculiar configuration of the dies, all as set forth.

2. The combination, with the paste-chamber of a pipe-candy machine, of the rotating dies C, gears D, worm F, and pulley H, all constructed, arranged, and operating substantially as and for the purpose specified.

In testimony that I claim the foregoing as my own I hereto affix my signature in presence of two witnesses.

OLIVER RICE CHASE.

Witnesses:
A. S. AUSTIN,
FRANK N. MUDGE.